Patented Dec. 13, 1932

1,890,769

UNITED STATES PATENT OFFICE

CHARLES E. BURKE, OF WILMINGTON, DELAWARE, ASSIGNOR TO E. I. DU PONT DE NEMOURS & COMPANY, OF WILMINGTON, DELAWARE, A CORPORATION OF DELAWARE

COATING COMPOSITION

No Drawing. Original application filed January 27, 1928, Serial No. 250,093. Divided and this application filed January 28, 1930. Serial No. 424,136.

This invention relates to coating compositions. More specifically it relates to coating compositions containing pentaerythrite ethers.

The pentaerythrite ethers may be prepared by mixing pentaerythrite with an ester of an inorganic acid in solution, an organic solvent and a fixed alkali and heating the mixture in an autoclave to reaction temperature. The specific method of preparing the ethers will be found disclosed in my co-pending case, Serial No. 250,093, filed January 27, 1928, of which this case is a division. As described in the said specification that process of preparation may be made to yield a mixture of mono-, di-, and trialkyl ethers of pentaerythrite. This mixture can be used in a coating composition or the individual ethers can be separated from it and used alone, or in combinations. The said specification also discloses how other alkyl ethers of pentaerythrite may be made and used as plasticizers in cellulose derivatives, for example, the lower alkyl ethers such as the methyl and butyl ethers.

Among the objects of this invention is the preparation of coating compositions, having superior chemical and physical qualities, from the use of pentaerythrite ethers as solvents, softeners, or plasticizers for cellulose derivatives.

These objects are accomplished, generally speaking, by mixing the cellulose derivatives with the pentaerythrite ethers in the manner taught by the prior art for the incorporation of other ingredients for a similar purpose.

These pentaerythrite ethers are, in general, useful as solvents, softeners and plasticizers for cellulose derivatives, for example, cellulose ethers or cellulose esters such as cellulose nitrate, and cellulose acetate. The following is one method which is suitable for producing compositions of this nature. Take 100 parts of a cellulose derivative, such as cellulose nitrate, and from 2 to 60 parts of a pentaerythrite ether, for example, the diethyl ether, and to this add a quantity of a mutual solvent sufficient to form a plastic mass. Such a composition may be plasticized in a mixer, rolled, cake-pressed and sheeted, according to the methods known to the plastic art, or the composition may be dissolved in a suitable volatile solvent and thinned to a consistency suitable for a coating composition with or without the addition of oils, resins, pigments and the like.

As many apparently widely different embodiments of this invention may be made without departing from the spirit thereof, it is to be understood that I do not limit myself to the foregoing examples or description, except as indicated in the following patent claims.

I claim:

1. A composition comprising cellulose nitrate and an ethyl ether of pentaerythrite.
2. A composition comprising cellulose nitrate and a triethyl ether of pentaerythrite.
3. A coating composition comprising cellulose nitrate and a mixture of the mono-, di-, and triethyl ethers of pentaerythrite.
4. A composition comprising cellulose nitrate and a diethyl ether of pentaerythrite.
5. A composition comprising a cellulose derivative and a lower alkyl ether of pentaerythrite.
6. A composition comprising cellulose nitrate and a lower alkyl ether of pentaerythrite.

In testimony whereof, I affix my signature.

CHARLES E. BURKE.